Aug. 23, 1932.  W. R. HAINSWORTH  1,873,390
REFRIGERATING APPARATUS
Filed Aug. 28, 1928    3 Sheets-Sheet 1
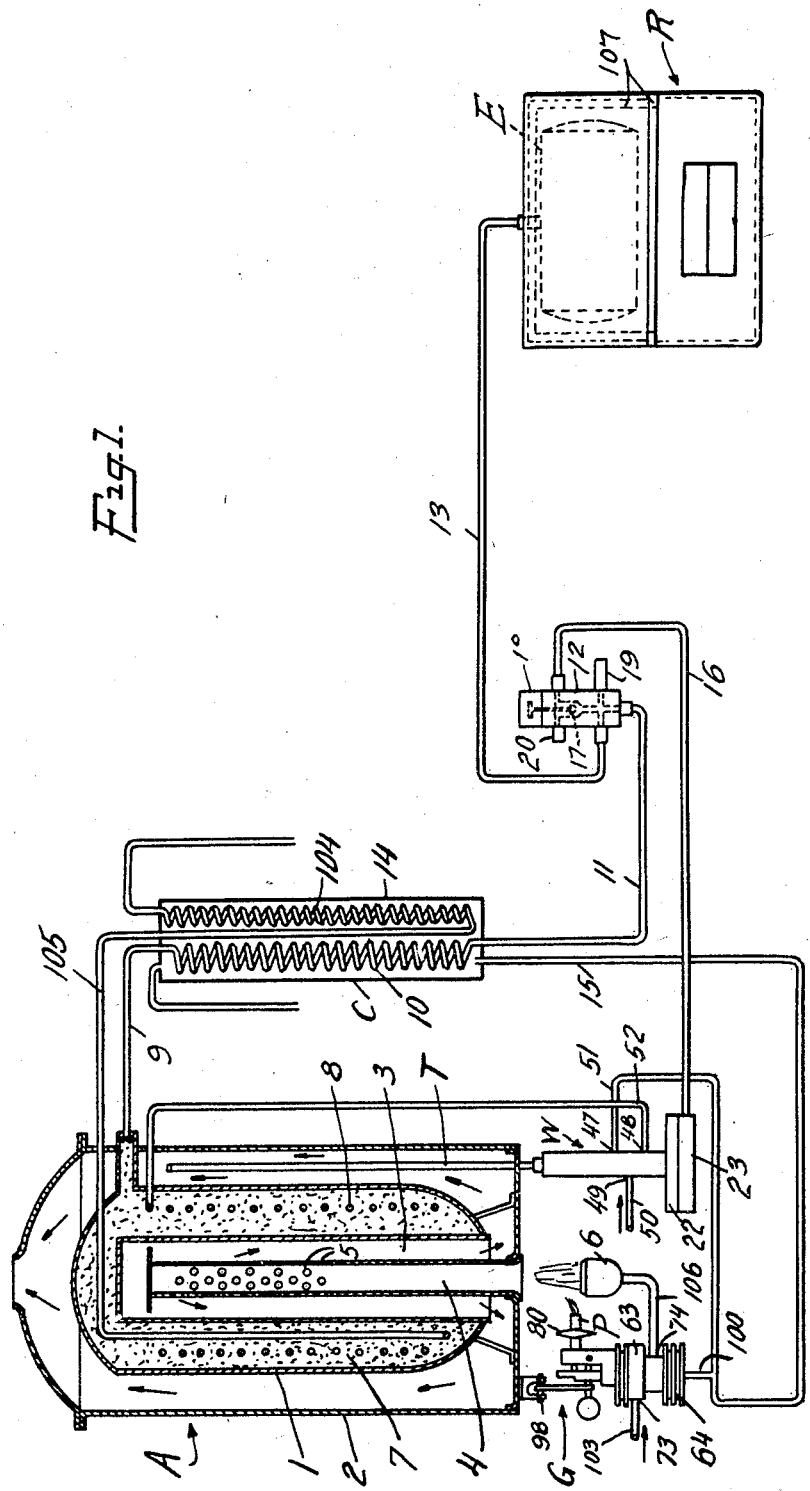
INVENTOR
William R. Hainsworth
BY
Pennie, Davis, Marvin & Edmonds
HIS ATTORNEYS

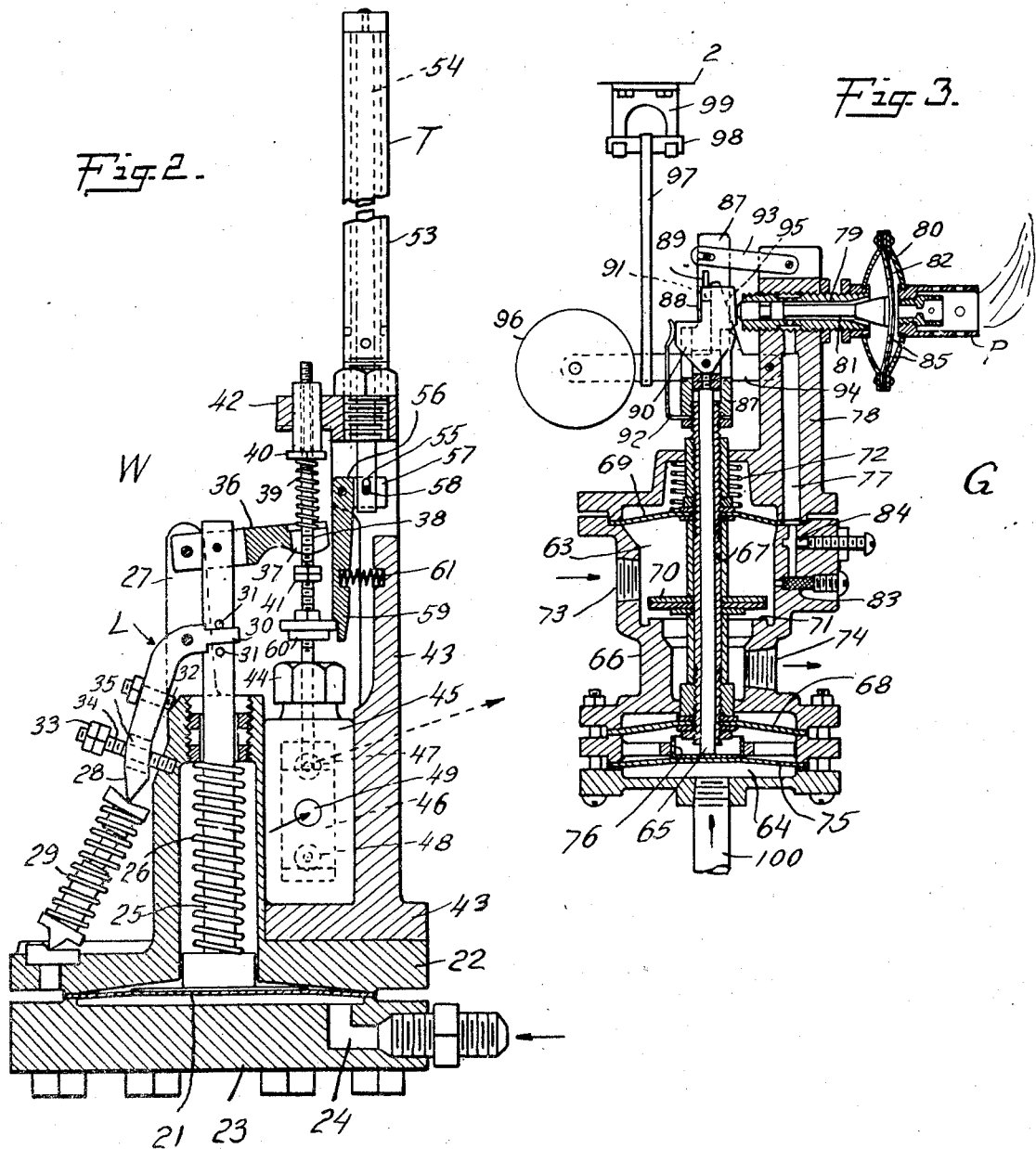

Aug. 23, 1932. W. R. HAINSWORTH 1,873,390
REFRIGERATING APPARATUS
Filed Aug. 28, 1928 3 Sheets-Sheet 3
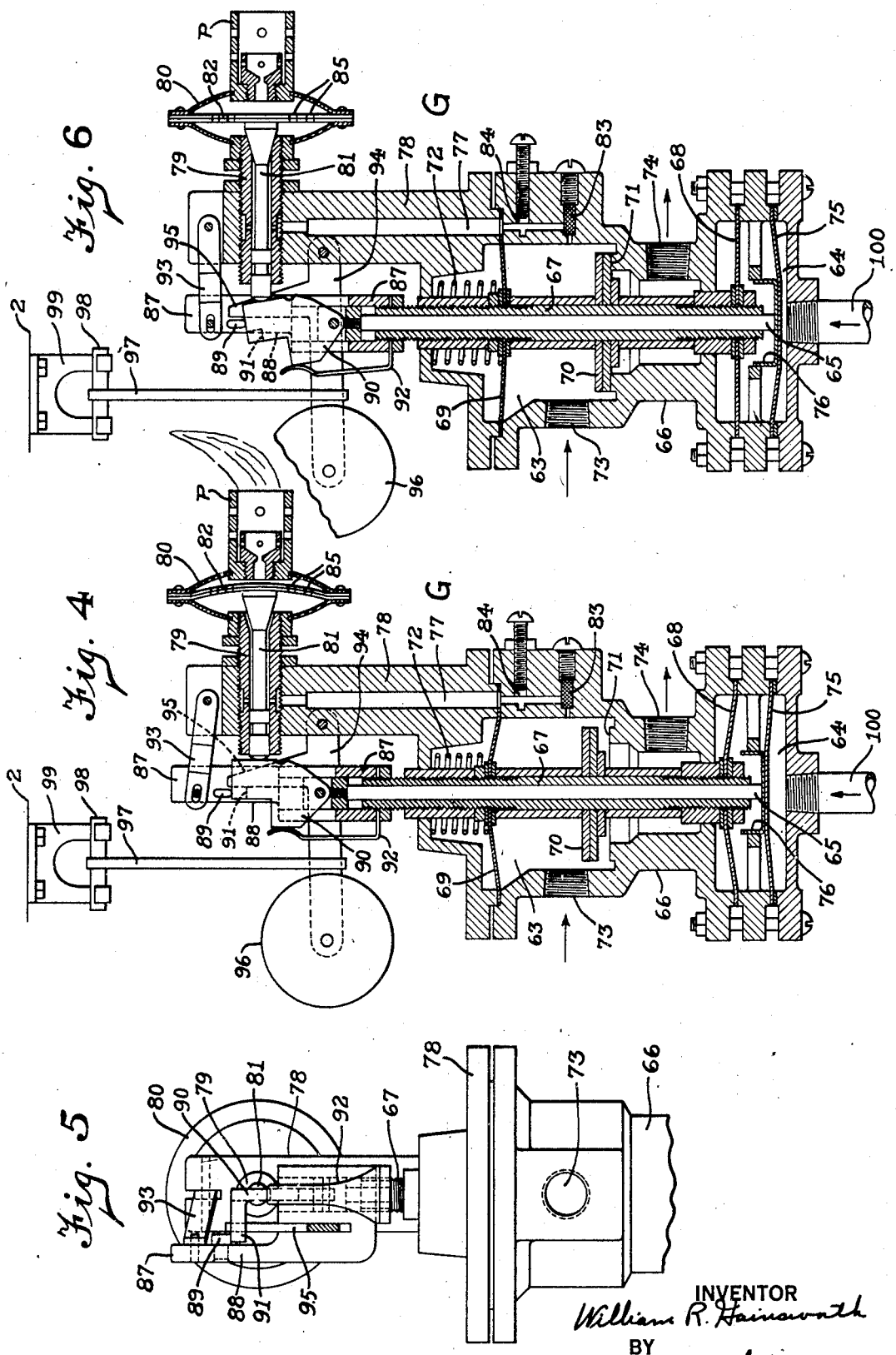

Patented Aug. 23, 1932

1,873,390

UNITED STATES PATENT OFFICE

WILLIAM R. HAINSWORTH, OF NEW HAVEN, CONNECTICUT, ASSIGNOR, BY MESNE ASSIGNMENTS, TO FRIGIDAIRE CORPORATION, A CORPORATION OF DELAWARE

REFRIGERATING APPARATUS

Application filed August 28, 1928. Serial No. 302,525.

This invention relates to refrigerating systems, and more particularly concerns an improved refrigerating system of the absorption type.

In one design of refrigerating system operating on the absorption principle, a combined absorber and generator is provided comprising a container filled with a suitable substance having the properly of absorption or occlusion, and means are provided in connection with the container to alternately supply heat to and cool this substance. The absorbent material is charged with a suitable liquefiable refrigerant in gaseous form, and this gas is expelled from the container at a high pressure when heat is applied to the absorbent material therein. The gaseous refrigerant expelled from the container is cooled and liquefied in a suitable condenser and is supplied in liquid form to a refrigerating chamber or evaporator. When a predetermined amount of liquid refrigerant collects in the evaporator, automatic apparatus operates to cut off the heat from the absorber generator and to supply a cooling medium thereto, whereupon the absorbent substance is cooled and tends to absorb the gaseous refrigerant, thus reducing the pressure within the absorber generator. When the pressure within the absorber generator is reduced, the liquid refrigerant in the evaporator gasifies, thus producing the desired refrigerating or heat absorbing effect. The gaseous refrigerant from the evaporator returns to the absorber generator container where it is absorbed by the absorbent substance therein, and after a predetermined amount of liquid refrigerant has thus been gasified, the cooling medium is cut off from the absorber generator and heat is again supplied thereto, thus repeating the cycle of operation of the system.

In a system of the type described, the refrigerant alternately flows from the absorber generator to the evaporator, and back from the evaporator to the absorber generator, during the successive distillation and absorption cycles, and considerable difficulty has been encountered when it is attempted to employ a single duct or conduit between the evaporator and the absorber generator for conducting the refrigerant between these containers during the successive distillation and absorption cycles. Generally in household and commercial installations, the evaporator is placed above and connected to the bottom of the condenser. During the distillation period refrigerant driven off from the absorbent material by the application of heat is condensed in the condenser and forced by the pressure within the system into the evaporator. Consequently at the termination of the heating period the lower end of the condenser and the connection between the condenser and evaporator will contain liquid refrigerant and unless some means is provided for forcing this liquid into the evaporator, considerable difficulty is encountered, due to the drawing back of the liquid refrigerant to the generator-absorber and thereby impairing the absorbing properties of the absorbent material. This is especially disadvantageous in the water cooled type of machine where the generator-absorber is subjected to a very rapid chilling at the initiation of the absorption period. Further the return of liquid refrigerant to the generator absorber reduces the total cooling capacity of the refrigerant within the system for the reason that no advantage is taken of the latent heat of evaporation of the refrigerant returned in liquid form to the generator-absorber. Thus, in known types of absorption refrigerating systems, a separate return duct for the gaseous refrigerant is usually provided, which duct shunts or by-passes the condenser, and suitable check or float valves are employed to insure the passage of the gaseous refrigerant through this duct during the absorption cycle.

With the above and other considerations in mind, it is proposed in accordance with the present invention to provide an absorption refrigerating system having a single refrigerant duct between the absorber generator and evaporator, and in which means is provided for purging the condenser and the duct of liquid refrigerant at the beginning of each absorption cycle and forcing the said liquid refrigerant into the evaporator where its cooling effect may be utilized and its return in liquid form to the absorber may be prevented.

More specifically, the present invention contemplates the provision of means for supplying heat to the condenser and thereby gasifying the liquid refrigerant therein before the refrigerant is absorbed by the material in the absorber generator. The heat for thus gasifying the liquid refrigerant within the condenser is conveniently obtained from the heated cooling medium which has been previously employed to absorb heat from the absorbent material within the absorber generator.

Other objects of the present invention include the provision of improved means for controlling the cyclic operation of the system, safety means for preventing the overheating of the absorber generator, and means for automatically cutting off the supply of fuel to the pilot burner or to the main burner if these burners are not properly ignited.

Various other objects, advantages and characteristic features of the invention will become apparent as the description thereof progresses.

In describing the invention in detail, reference will be made to the accompanying drawings, in which:

Figure 1 is a simplified and diagrammatic view of the refrigerating system of the present invention, with certain parts thereof shown in section;

Fig. 2 is a sectional view of the water control device of the system shown in Fig. 1;

Fig. 3 is a sectional view of the gas control device employed in the system shown in Fig. 1;

Fig. 4 is an enlarged sectional view of the gas control shown in Fig. 3;

Fig. 5 is an enlarged view in elevation of a portion of the gas control shown in Fig. 3; and Fig. 6 is a sectional view of the gas control device with the gas valve closed under abnormal conditions.

In describing the invention, a typical absorption refrigerating system, embodying the features of the present invention, will be described, it being understood that the system shown merely illustrates one of many systems to which the various features of the invention may be applied.

As shown in Fig. 1, the refrigerating system disclosed comprises generally an absorber generator A, a refrigerant condenser C and an evaporator E enclosed within a refrigeration unit R.

The absorber and generator of the system may comprise separate units, but in the system shown, these devices are combined in the absorber generator A which consists of a container 1 surrounded by a suitable cover or stove 2. The container 1 is preferably constructed with a central cavity 3 therein, and a chimney 4 having suitable openings 5 in the upper end thereof is disposed within this cavity to conduct the hot gases from a burner 6 first to the surfaces of the cavity 3 and then to the exterior surfaces of the container 1. In this manner, the heating gases come into contact with a large surface area of the container. The container 1 is filled with a suitable substance having the property of absorbing relatively large quantities of the refrigerant employed when this refrigerant is in the gaseous state. The refrigerant employed may be anhydrous ammonia or any other suitable liquefiable gas, and the absorbent substance may comprise charcoal, calcium chloride, diatomaceous earth, silica "gel" or any other suitable substance having the property of effecting the adsorption or occlusion of the refrigerant used. The absorbent substance is preferably in dry, powdered or lump form, and has been represented at 7 in the container 1.

The container 1 is provided with suitable cooling means, which, in the embodiment shown, comprises a cooling coil 8 within the container, this coil being supplied with water from a water supply pipe 50 through a water control device W which is operated as hereinafter described. Although the absorber generator A has been shown and described as being heated by a gas burner and cooled by a water coil, it is evident that other suitable means, may be employed to secure the desired heating and cooling effects in this unit. For example, the container 1 may be heated by an electric heating unit and a current of air conducted through suitable flues may be employed as a cooling medium for the container.

The container 1 of the absorber generator A is connected to the evaporator E through a single duct or conduit which comprises the pipe 9, the condenser coil 10, the pipe 11, the manifold 12 and the pipe 13. The condenser coil 10 is preferably enclosed within a suitable tank 14 which is at times supplied with a cooling medium such as water through a pipe 15. The manifold 12 serves to connect the pipes 11 and 13, and further connects a pressure pipe 16 to the refrigerant conduit. A normally open service valve 17, suitably enclosed by a cap 18, is preferably provided in the manifold 12 to shut off the refrigerant from the pressure pipe 16. The manifold 12 may be further provided with other outlets or connections such as a rupture diaphragm 19 and a gauge connection 20.

The cyclic operation of the absorption refrigerating system is controlled in accordance with the conditions of temperature and pressure in the system by means of two control devices, a water control device W and a gas control device G. The water control device W is operated jointly by the pressure of the refrigerant in the conduit leading to the evaportor E and by the temperature of the flue gases leaving the absorber generator A.

The water control device W, shown in detail in Fig. 2, includes a flexible diaphragm 21, suitably clamped between a casing 22 and an end plate 23, the end plate being provided with a passage 24 which is connected to the pressure pipe 16 and which communicates with the lower surface of the diaphragm 21. A plunger 25 bears on the upper surface of the diaphragm 21, being suitably journaled in the housing 22 and being pressed downwardly against this diaphragm by a spring 26. A spring toggle mechanism is provided to maintain the plunger 25 either in its extreme upper position or in its extreme lower position, and to cause the rapid and positive movement of this plunger to its extreme positions. As shown in the drawings, the toggle mechanism comprises a bell crank lever L pivotally connected to an extension 27 of the casing 22 and having a lower arm 28 engaged by a compressed spring 29. The upper arm 30 of the bell crank lever L alternately engages a pair of suitably spaced pins 31 on the plunger 25, and the movement of the bell crank lever is limited by a stop screw 32 threadedly connected thereto, and by a nut 33 carried by a machine screw 34 passing through an opening 35 in the lower arm 28 of the lever.

The upper end of the plunger 25 is pivotally connected to a lever 36 which is also pivoted to the fixed extension 27, the lever 36 having a bifurcated free end 37 through which a water valve operating rod 38 passes. A coiled spring 39 is carried by the rod 38 and engages a nut 40 thereon, this spring forming a flexible connection between the lever 36 and the rod 38. A second nut 41 is locked to the rod 38 below the lever 36 as shown. The valve operating rod 38 is slidably journaled in an extension 42 of a bracket 43 connected to the housing 22, and the lower end of the rod 38 passes through a packing gland 44 of a water valve casing 45. A valve gate 46 is slidably mounted within the casing 45 and is connected to the rod 38, this gate being arranged to close the outlet openings 47 and 48 in the casing 45 when in its upper and lower positions respectively. An inlet opening 49 is provided in the casing 45, and a suitable source of water is connected thereto through the pipe 50 (see Fig. 1). The water outlet openings 47 and 48 are respectively connected to the pipes 51 and 52.

The bracket 43 carries a thermostatic device T comprising a tube 53 of a suitable metal having a comparatively high coefficient of temperature expansion, such as copper, this tube surrounding a rod 54 of invar or any other suitable metal having a lower coefficient of temperature expansion than the metal comprising the tube 53. The lower end of the tube 53 is suitably fixed to the bracket 43 and the rod 54 and tube 53 are suitably connected at their upper ends. The lower end of the rod 54 extends through an opening in the bracket 43 and is provided with an elongated transverse opening 55. The thermostatic device T extends within the housing 2 of the absorber generator A, as shown in Fig. 1. A latch in the form of a bell crank lever 56 is pivotally secured to the bracket 43, and the upper arm 57 thereof carries a pin 58 which engages the opening 55 in the rod 54. The lower arm 59 of the bell crank lever 56 is notched or otherwise shaped to engage the edge of a disc 60 fixed to the valve operating rod 38 as shown. The bell crank lever 56 is biased to the position shown by a spring 61, the opposite ends of which respectively engage the bracket 43 and the lower arm 59 of the bell crank lever.

From the description given, it will be apparent that when a predetermined pressure is applied to the diaphragm 21 of the device W, the plunger 25 is lifted, being rapidly propelled to its extreme upper position by the toggle spring 29. In this position, the lever 36 compresses the spring 39, and when the lower arm 59 of the bell crank lever 56 is withdrawn from the disc 60 by the action of the thermostatic device T, the valve operating rod 38 is lifted to a position in which the lower water outlet opening 48 is uncovered and the upper outlet opening 47 is covered by the valve gate 46. When the pressure on the diaphragm 21 is reduced below a predetermined value, the spring 26 forces the plunger 25 to its lower position, the lever 36 engages the stop nut 41 and the rod 38 together with the valve gate 46 is moved to the lower position in which the water outlet opening 47 is covered and the opening 48 is uncovered. As the rod 38 is thus depressed, the lower arm 59 of the bell crank lever 56 is forced into engagement with the disc 60, thereby maintaining the rod 38 and the valve gate 46 in their lower positions until the temperature of the thermostatic device is increased to a predetermined value. The operation of the edvice W in connection with the refrigerating system as a whole will be hereinafter described.

The gas control device G, shown in detail in Fig. 3, comprises generally a gas valve chamber 63, a water chamber 64, a pilot burner P and suitable means for controlling the passage of gas to the burner through the gas chamber in accordance with the water pressure in the water chamber. An operating rod 65 extends axially through the casing 66 of the device G, and is slidably carried in a sleeve 67 which in turn is slidably journaled in openings in the top and bottom of the casing 66. The lower end of the sleeve 67 is connected to a flexible diaphragm 68 which serves as a fluid-tight partition across the lower end of the gas chamber 63, and a second flexible diaphragm 69 is fixed to the sleeve 67 at the upper end of the gas chamber 63 to prevent the leakage of gas at this point. A gas valve gate 70 is fixed to the sleeve 67 within the chamber 63 and is adapted to engage a valve seat 71 when the sleeve 67 is in its lower position. A coiled spring 72 engages the upper face of the diaphragm 69, and biases the sleeve 67, together with the valve gate 70, to the lower or closed position. A gas inlet opening 73 is provided in the wall of the casing 66 in communication with the gas chamber 63, and a gas outlet opening 74 is provided below the valve seat 71 as shown. A gas supply pipe 103 is connected to the gas inlet opening 73, and the gas outlet opening 74 is connected through a pipe 106 to the burner 6. A water diaphragm 75 is provided across the water chamber 64, and a guide 76 is connected to this diaphragm and engages the lower end of the rod 65. A gas channel 77 extends upwardly from the gas chamber 63 through an extension 78 connected to the housing 66, and communicates at its upper end with a tubular valve chamber 79. A strainer 83 and an adjustable pressure regulator valve 84 are preferably provided in the channel 77. A diaphragm housing 80 is connected to the outer end of the valve chamber 79, and a valve rod 81 having a tapered plug on the outer end thereof is journaled in the valve chamber and engages a thermostatic diaphragm 82 fixed across the casing 80. The diaphragm 82 is of laminated construction, preferably comprising two suitably connected layers of metals having different co-efficients of temperature expansion, the arrangement being such that when the diaphragm is heated to a predetermined temperature it will assume and maintain the position shown, and when the temperature thereof falls below a predetermined valve, the diaphragm will snap to the left as viewed in Fig. 3, and seat the plug of the valve rod 81 to cut off the gas supply. A plurality of openings 85 are provided through the diaphragm 82 to permit the passage of gas therethrough, and a suitable pilot burner P is secured to an opening in the outer face of the diaphragm housing 80.

The upper end of the sleeve is provided with an extension 87 having a cut-away portion 88 providing a downwardly disposed abutment or stop 89. A latch 90 is pivotally secured to the upper end of the rod 65, and is provided with a transverse lug 91 normally extending into the cut-away portion 88 on the sleeve 67 and engaging the stop 89. The latch 90 is normally held in the engaged position as shown by a suitable spring 92. The upper end of the sleeve extension 87 is preferably connected to the extension 78 by a link 93. When the latch 90 is in the engaged position as shown, upward movement of the rod 65 due to water pressure on the lower face of the diaphragm 75 is transmitted to the sleeve 67 through the latch 90, the lug 91 and the abutment 89, and the sleeve 67 is lifted, thereby opening the gas valve 70. If, however, the latch 90 is moved to the left against the resistance of the spring 92, the lug 91 of the latch disengages the abutment 89, and the sleeve 67 is maintained in its lower or valve closing position by the spring 72 regardless of upward movement of the operating rod 65.

The latch 90 may be independently moved to its disengaged position by either one of two separate means. The inner end of the valve rod 81 of the automatic pilot valve engages the latch 90 and when the thermostatic diaphragm 82 snaps to its inner or left hand position, the rod 81 is moved to the left as shown in Fig. 3 and the latch 90 is tilted to its disengaged position. A lever 94 is pivotally connected to the extension 78 and is provided with an upwardly extending arm 95 arranged to engage the lug 91 on latch 90. A weight 96 is fixed to the free end of the lever 94, and the lever is normally retained in a horizontal position as shown by a strap or hook 97 engaging the lever and supported by a fusible link 98 carried in a bracket 99 which is fixed to the housing 2 of the absorber generator A. When the temperature of the absorber generator housing 2 rises above a predetermined value, the fusible link 98 melts and releases the lever 94 which is then carried downwardly by the weight 96. During the downward movement of the lever 94, the arm 95 thereon engages the lug 91 on the latch 90, and carries this lug out of engagement with the abutment 89 on the sleeve extension 87.

The water chamber 64 of the device G is connected to the water pipe 51 through the pipe 100. A suitable gas supply line 103 is connected to the inlet opening 73, and the gas outlet opening 74 is connected to the burner 6 through a pipe 106. The operation of the gas control device in connection with the refrigerating system as a whole will be hereinafter described.

In accordance with the present invention, suitable means are provided for vaporizing a part of the liquid refrigerant in the condenser coil 10 to thereby force the remaining liquid refrigerant into the evaporator at the beginning of each absorption cycle, and in the embodiment shown, this vaporizing means comprises a coil 104 located within the condenser tank 14 and connected to the outlet of the cooling coil 8 of the absorber generator. During each distillation cycle, the cooling coil 8 and the absorbent material 7 surrounding this coil are heated to a comparatively high temperature, and when cooling water is supplied to the coil 8 at the beginning of an absorption cycle, this water absorbs considerable heat from the coil and the absorbent material. The heat thus absorbed by the cooling water passing through the coil 8 is transferred through the coil 104 and the water within the condenser tank 14, to the condenser coil 10, and a part of the liquid refrigerant within the condenser coil is thereby vaporized. The vaporization of a part of the liquid refrigerant temporarily increases the pressure on the generator side of the liquid refrigerant in the condenser coil, causing the remainder thereof to be forced upwardly into the evaporator. This vaporization of the liquid refrigerant remaining in the condenser coil at the end of each distillation cycle, takes place at the beginning of each absorption cycle, and before the absorbent material 7 has been cooled to a temperature at which the refrigerant is absorbed thereby.

The operation of the system disclosed is generally divided into two cycles, the distillation cycle and the absorption cycle. The distillation cycle begins when substantially all of the liquid refrigerant in the evaporator E has gasified and has been absorbed within the absorber generator A. At this point, the pressure in the duct which connects the evaporator and the absorber generator falls to a value low enough to permit the spring 26 of the water control device W to force the plunger 25 downward to its lower position, thereby moving the operating rod 38 and the valve gate 46 of this device downward, uncovering the water outlet 47 and closing the water outlet opening 48, thereby cutting off the supply of water to the pipe 52 and the cooling coil 8 of the absorber generator A. Cooling water from the supply pipe 50 now flows through the pipes 51 and 15 to the tank 14 of the condenser C, thereby lowering the temperature of the condenser coil 10. When the valve operating rod 38 of the water control device W is moved to its lower position as described, the lower arm 59 of the bell crank lever 56 is forced into engagement with the disc 60 on the rod 38, and this rod, together with the valve gate 46, is thereby maintained in the lower position until the upper arm 57 of the bell crank lever 56 is lifted by the thermostat T as hereinafter described.

The pressure of the cooling water in the pipes 51 and 15 is applied through the pipe 100 to the water diaphragm 75 of the gas control device G, and this diaphragm and the operating rod 65 in engagement therewith is thereby lifted. Assuming that the latch 90 of the device G is in the normal position as shown, the sleeve 67 carrying the gas valve gate 70 is lifted by the rod 65, and gas from the supply pipe 103 is admitted to the burner 6 through the pipe 106. The flame from the pilot burner 86 lights the main burner 6, and heat from this burner is supplied to the absorbent material 7 within the container 1 of the absorber generator A.

The heat from the burner gases is rapidly absorbed by the absorbent material, and the gaseous refrigerant therein is thereby expanded and distilled from this, material passing out of the container 1 through the pipe 9. The gaseous refrigerant passes through the condenser coil 10, the pipe 11, the manifold 12 and the pipe 13 of the evaporator E. Due to the refrigerating effect produced by the evaporation of liquid refrigerant in the evaporator during the preceding absorption cycle, the evaporator E is at a considerably lower temperature than the condenser coil 10 when the distillation cycle is initiated. The gaseous refrigerant expelled from the absorber generator during the first part of the distillation cycle is therefore condensed and liquefied in the evaporator rather than in the condenser, there being no valves in the refrigerant conduit to control the vapor pressure in the condenser. This condensation of the refrigerant in the evaporator continues until the evaporator temperature has risen to a value higher than that of the condenser, whereupon the refrigerant is condensed and liquefied in the condenser coil 10 and passes to the evaporator in liquid form. The temporary rise in temperature of the evaporator E caused by the condensation of the refrigerant therein does not materially affect the temperature of the refrigerator. The refrigeration unit R is preferably in the form of a brine tank and the upper part thereof containing the evaporator E is insulated from the refrigerator and from the lower part of the tank by suitable heat insulating walls 107. The brine which is temporarily heated by the evaporator E during the condensing of the refrigerant therein, is lighter than the cooled brine in the bottom of the unit R and consequently remains within the upper heat insulated portion of the unit.

The refrigerant expelled from the absorber generator container through the refrigerant conduit during the distillation cycle is under considerable pressure due to its expansion within the container 1, and this pressure is applied to the diaphragm 21 of the water control device W through the pipe 16. The diaphragm 21 and the plunger 25 of the device W are thus lifted shortly after the initiation of the distillation cycle, and the lever 30 compresses the spring 39 on the operating rod 38, this rod together with the valve gate 46 remaining in their lower positions due to the engagement of the latch arm 59 of the bell crank lever 56 with the disc 60 on the rod 38, as described above.

The distillation cycle continues until substantially all of the gaseous refrigerant has been expelled from the absorbent material 7 within the container 1. As successive quantities of gaseous refrigerant are distilled and expelled from the material 7, the rate at which heat is absorbed by this material decreases, and consequently, the temperature of the gases leaving the lower end of the recess 3 in the container 1, and coming into contact with the thermostatic device T, increases. Thus the temperature of the device T is gradually increased during the distillation cycle and this device is so proportioned and designed that the temperature to which it is heated when substantially all of the gaseous refrigerant has been expelled from the container 1 is sufficient to cause its expansion to a point at which the rod 54 thereof lifts the upper arm 57 of the bell crank lever 56 thereby moving the lower arm 59 out of the path of the disc 60 on the operating rod 38. As explained above, the pressure of the refrigerant in the refrigerant conduit has previously lifted the plunger 25 and compressed the spring 39, and consequently when the disc 60 is released as described above, the spring 39 expands and raises the operating rod 38 together with the valve gate 46 to the upper position. In this position, the gate 46 closes the water outlet 47, cutting off the supply of cooling water to the condenser tank 14, and opens the water outlet 48, permitting water to flow through the pipe 52 to the cooling coil 8 of the absorber generator A. When the condenser cooling water flowing through the pipe 51 is thus cut off, the diaphragm 64 of the gas control device G is depressed by the spring 72 due to the reduction in water pressure below the water diaphragm 65, and the gas valve 70–71 is closed, thereby cutting off the supply of gas to the burner 6 and ending the distillation cycle.

The cooling coil 8 and the absorbent material 7 surrounding this coil are heated to a comparatively high temperature during the distillation cycle, and when cooling water from the device W is supplied to the coil 8 at the end of the distillation cycle, this water absorbs considerable heat from the cooling coil and the absorbent material. The water thus heated flows through the pipe 105 and the coil 104 in the condenser tank 14 and the heat from the absorber is thus transferred to the condenser coil 10. Some of the liquid refrigerant within the coil 10 is thereby vaporized before the absorbent material 7 is cooled to a temperature at which the refrigerant is absorbed thereby. The vaporization of this portion of the liquid refrigerant temporarily increases the pressure within the condenser coil, thereby forcing the remaining liquid refrigerant from the condenser coil 10 through the conduits 11 and 13 into the evaporator and the flow of refrigerant in liquid form from the condenser to the container 1 and into contact with the absorbent material 7, is thereby prevented.

As the absorbent material 7 is cooled by the coil 8 the gaseous refrigerant is absorbed thereby and the pressure in the refrigerant duct and in the evaporator E is reduced. The liquid refrigerant in the evaporator now gasifies producing the desired heat absorbing or refrigerating effect. The absorption cycle continues until a predetermined amount of liquid refrigerant has gasified in the evaporator, at which point the pressure within the refrigerant conduit and below the diaphragm 21 of the device W is reduced to a value at which the spring 26 depresses the plunger 25 and the distillation cycle is initiated as explained above.

At the end of the distillation cycle, the water standing within the coil 8 in the absorber generator container 1 is at a relatively high temperature, and when cooling water from the device W is supplied to the inlet end of the coil 8 at the end of the distillation cycle, as described above, this hot water from the coil 8 is forced through the pipe 105 into the coil 104 in the condenser tank 14. Thus heat is supplied to the water within the condenser tank 14, the condenser coil 10 therein is heated, and some of the liquid refrigerant therein is vaporized before the absorbent material 7 is cooled to a temperature at which the refrigerant is absorbed thereby. In this manner, the flow of the refrigerant in liquid form to the container 1 and into contact with the material 7, is prevented.

As the absorbent material 7 is cooled by the coil 8 the gaseous refrigerant is absorbed thereby and the pressure in the refrigerant duct and in the evaporator E is reduced. The liquid refrigerant in the evaporator now gasifies producing the desired heat absorbing or reducing effect. The absorption cycle continues until a predetermined amount of liquid refrigerant has gasified in the evaporator, at which point the pressure within the refrigerant conduit and below the diaphragm 21 of the device W is reduced to a value at which the spring 26 depresses the plunger 25 and the distillation cycle is initiated as explained above.

In starting the operation of the refrigerating system, the valve rod 81 of the pilot valve in the device G is manually or otherwise moved to and maintained in the open or right hand position, and the pilot burner 86 is lighted. Heat from the pilot flame is rapidly transmitted from the burner 6 through the casing 80 to the thermostatic diaphragm 82, and when this diaphragm is heated to a predetermined temperature, it will remain in the right hand position and the valve rod may be released. The extension 87 on the sleeve 67 of the device G is then lifted until the lug 91 of the latch 90 engages beneath the abutment 89. This operation opens the gas valve 70–71 and permits the flow of gas to the burner 6, which gas is ignited by the pilot flame. The successive distillation and absorption cycles then proceed as described above.

If, during the operation of the system, the pilot flame is accidentally extinguished by reason of air currents, a momentary failure of the gas pressure, or other causes, the thermostatic diaphragm 82 rapidly cools off, and snaps to its left hand position, forcing the pilot valve rod 81 to the closed position and disengaging the latch 90, as explained above. In this manner, the escape of gas from the extinguished pilot burner is prevented. After such automatic closing of the pilot burner valve, the main gas valve 70-71 cannot be opened by water pressure on the diaphragm 64, since the operating connection between the rod 65 and the valve operating sleeve 67 has been broken at the latch 90. If the pilot burner is extinguished while the main gas burner is ignited, the tripping of the latch 90 disconnects the sleeve 67 of the device G from the operating rod 65, and the spring 72 closes the main gas valve 70-71. Thus if both the pilot flame and the main burner flame are extinguished accidently, the escape of gas therefrom is quickly cut off by automatic means.

If for any reason the absorber generator A is heated to an excessively high temperature, the fusible link 98 melts, dropping the weight lever 94 and the arm 95 of this lever trips the latch 90. The spring 72 then forces the sleeve 67 of the gas valve gate 70 to the closed position as set forth above, thereby turning off the supply of gas to the main burner 6.

In Fig. 6 the parts of the apparatus are shown in position after the pilot light has been accidentally extinguished during the absorption cycle. During this cycle the diaphragm 75 is in its lowest position due to the absence of water pressure in the pipe 100. Extinguishing of the pilot light "P" causes the diaphragm 82 to cool, thereby contracting and forcing the rod 81 to the left to thereby close the pilot gas valve and to force the latch 91 away from the lug 89. This movement of the latch 91 disengages the rod 65 from the sleeve 67 and permits the valve 70 to close under the action of the spring 72. Further movement of the rod 65 due to water pressure in the pipe 100 below the diaphragm 75 will not affect the valve 70 until such time as the connection between the rod 65 and the sleeve 67 is again made.

Due to the above described operation of the control devices, a refrigerating system embodying the present invention is protected against excessive pressure due to the overheating of the absorber generator, and is further protected against gas leakage due to the accidental extinguishing of the burner flames. These safety features make the present invention especially adaptable to domestic installations where reliability of operation and protection against gas leakage and excessive pressures are features of paramount importance.

From the description given, it will be apparent that the refrigerating system of the present invention has many advantageous features. In addition to the safety features pointed out above, it should be noted that the system is extremely simple in construction, employing only one refrigerant duct between the absorber generator and the evaporator. Due to the control arrangement described, it is unnecessary to employ check valves or any other fluid flow controlling means in the refrigerant conduit, and the maintenance of the system is thereby greatly simplified. Further, the control devices are operated solely by the refrigerant and water pressures developed within the system and electricity or other external power sources need not be employed in connection with these devices.

Although the present invention has been described in connection with a single specific refrigerating system embodying certain specific devices and units, it should be clearly understood that various changes, modifications, additions or omissions may be made in in the system without departing from the scope of the invention as defined by the appended claims.

I claim:

1. In a refrigerating system, an absorber generator for alternately expelling and absorbing a gaseous refrigerant during successive distillation and absorption cycles, an evaporator for alternately receiving liquid refrigerant and evaporating said refrigerant during successive distillation and absorption cycles, a single conduit connecting said absorber generator and said evaporator, means for cooling said conduit during each distillation cycle to liquefy said refrigerant and means for heating said conduit to gasify liquid refrigerant therein at the initiation of each absorption cycle.

2. In a refrigerating system of the absorption type, a refrigerant generator, means for intermittently operating said generator to expell a gaseous refrigerant therefrom, a condenser connected to said generator for receiving and liquefying the refrigerant expelled from said generator, an evaporator connected to said condenser and means for gasifying liquid refrigerant in said condenser when said generator is inactive.

3. In a refrigerating system of the absorption type, an absorber generator for alternately expelling and absorbing a gaseous refrigerant, a condenser connected to said absorber generator for liquefying the gaseous refrigerant expelled therefrom, an evaporator connected to said condenser and means for gasifying liquid refrigerant in said condenser before the refrigerant vapor from said evaporator is absorbed by said absorber generator.

4. In an absorption refrigerating system, an absorber generator for alternately expelling and absorbing a gaseous refrigerant during successive distillation and absorption cycles, an evaporator for receiving the refrigerant from said absorber generator during each distillation cycle, a condenser connected between said absorber generator and said evaporator and means for cooling said condenser during each distillation cycle to liquefy the refrigerant and for heating said condenser at the initiation of each absorption cycle to gasify liquid refrigerant therein.

5. In a refrigerating system, an absorber generator, means for alternately supplying heat to said absorber generator to distil a refrigerant therefrom and supplying a cooling medium thereto to cause the absorption of refrigerant thereby, a condenser for receiving and liquefying the refrigerant expelled by said absorber generator, means for cooling said condenser while said refrigerant is being distilled from said absorber generator, and means for heating the condenser by supplying the heated cooling medium from said absorber generator thereto before the refrigerant is absorbed by said absorber generator.

6. In an absorption refrigerating system, an absorber generator for alternately expelling and absorbing a gaseous refrigerant during successive distillation and absorption cycles, means for supplying heat to said absorber generator during each distillation cycle, means for supplying a cooling medium to said absorber generator during each absorption cycle, a condenser for receiving and liquefying the refrigerant expelled during each distillation cycle, and means for supplying the heated cooling medium from said absorber generator to said condenser during each absorption cycle.

7. In a refrigerating system of the absorption type, an absorber generator comprising a container having an absorbent substance therein capable of absorbing a gaseous refrigerant, means for at times applying heat to said container to expel the gaseous refrigerant therefrom, a condenser connected to said container for liquefying the gaseous refrigerant so expelled, an evaporator connected to said condenser for receiving the liquefied refrigerant from said condenser, means for alternately cooling said condenser to liquefy the gaseous refrigerant delivered thereto from said absorber generator container, and heating said condenser to gasify liquid refrigerant therein.

8. In an absorption refrigerating system, an absorber generator for alternately expelling and absorbing a gaseous refrigerant during successive distillation and absorption cycles, an evaporator for receiving the expelled refrigerant from said absorber generator during each distillation cycle, a condenser connected between said absorber generator and said evaporator for liquefying the gaseous refrigerant expelled by said absorber generator, means operated by the fluid pressure in said evaporator for supplying a cooling medium to said condenser during each distillation cycle and to said absorber generator during each absorption cycle, means for supplying heated cooling medium from said absorber generator to said condenser at the beginning of each absorption cycle, and means controlled by the cooling medium supplied to said condenser for supplying heat to said absorber generator during each distillation cycle.

9. In the art of refrigeration through the agency of an absorption system that step comprising utilizing the sensible heat of the generator-absorber at the initiation of the absorption period to prevent the return of liquid refrigerant to the absorber.

10. A refrigerating system comprising a generator-absorber, a condenser and an evaporator, a single two-way passage from said generator-absorber to said evaporator, means for heating the generator-absorber, means for cooling the generator-absorber and means whereby the initial cooling of the generator-absorber is utilized to force any liquid refrigerant remaining in the condenser and in the passage into the evaporator to thereby prevent the return of liquid refrigerant to the generator-absorber.

11. That step in the art of refrigeration through the agency of an absorption system which comprises utilizing the heat of the generator-absorber at the termination of the distillation period to force any liquid refrigerant remaining in the condenser into the evaporator.

12. That step in the art of refrigeration through the agency of an absorption system which comprises utilizing the heated cooling medium upon initiation of the absorption period to vaporize any liquid refrigerant in the vapor return line.

13. That improvement in the art of refrigeration which comprises evaporating a liquid refrigerant, cooling the absorbing material by the application of cooling water, absorbing the evaporated refrigerant in the cooled absorbent material and utilizing the heat imparted to the initial flow of cooling water to gasify any liquid refrigerant in the vapor return line.

14. Refrigerating apparatus comprising a generator-absorber, means for alternately and intermittently heating and cooling said generator-absorber, an evaporator, a conduit for conducting refrigerant from the generator-absorber to the evaporator during the heating period and for conducting refrigerant from the evaporator to the generator-absorber during the cooling period, a condenser forming part of said conduit, and means operative after the termination of said heating period but before refrigerant is absorbed by said generator-absorber during the cooling period for preventing passage into said generator-absorber of any liquid refrigerant collecting in said conduit.

15. Refrigerating apparatus comprising a generator-absorber, means for alternately and intermittently heating and cooling said generator-absorber, an evaporator, a conduit for conducting refrigerant from the generator-absorber to the evaporator during the heating period and for conducting refrigerant from the evaporator to the generator-absorber during the cooling period, a condenser forming part of said conduit, and means operative after the termination of said heating period but before refrigerant is absorbed by said generator-absorber during the cooling period for forcing liquid refrigerant remaining in said conduit into said evaporator.

In testimony whereof I affix my signature.

WILLIAM R. HAINSWORTH.